US012579691B2

(12) United States Patent
Shi et al.

(10) Patent No.: US 12,579,691 B2
(45) Date of Patent: Mar. 17, 2026

(54) METHOD, APPARATUS, AND DEVICE FOR DETERMINING SPECTRAL REFLECTION

(71) Applicant: ORBBEC INC., Shenzhen (CN)

(72) Inventors: Shaoguang Shi, Shenzhen (CN); Xiaobo Lv, Shenzhen (CN); Min Liu, Shenzhen (CN); Yaqin Zhang, Shenzhen (CN)

(73) Assignee: ORBBEC INC., Shenzhen (CN)

( * ) Notice: Subject to any disclaimer, the term of this patent is extended or adjusted under 35 U.S.C. 154(b) by 352 days.

(21) Appl. No.: 18/373,888

(22) Filed: Sep. 27, 2023

(65) Prior Publication Data

US 2024/0020883 A1    Jan. 18, 2024

Related U.S. Application Data

(63) Continuation of application No. PCT/CN2022/080525, filed on Mar. 13, 2022.

(30) Foreign Application Priority Data

Jun. 30, 2021    (CN) ........................ 202110754926.X

(51) Int. Cl.
*G06T 7/50* (2017.01)
*G06T 7/90* (2017.01)

(52) U.S. Cl.
CPC .................. *G06T 7/90* (2017.01); *G06T 7/50* (2017.01); *G06T 2207/10024* (2013.01)

(58) Field of Classification Search
CPC ... G06T 7/90; G06T 7/50; G06T 2207/10024; G06T 7/593; G06T 7/85;
(Continued)

(56) References Cited

U.S. PATENT DOCUMENTS 11,769,241 B1 * 9/2023 Rhoads ................. G06T 7/0004
382/103
2011/0176029 A1 * 7/2011 Boydston .................. G01J 3/50
348/E9.051
(Continued)

FOREIGN PATENT DOCUMENTS

CN        103226832 A      7/2013
CN        109682814 A      4/2019
(Continued)

OTHER PUBLICATIONS

PCT International Search Report and the Written Opinion mailed Aug. 4, 2022, issued in related International Application No. PCT/CN2022/080525, with partial English translation (9 pages).

*Primary Examiner* — Ali Bayat
(74) *Attorney, Agent, or Firm* — Sheppard Mullin Richter & Hampton LLP

(57) ABSTRACT

A method includes: obtaining a registration depth map and a target spectral image; obtaining depth information of a target point from the registration depth map, and obtaining a first grayscale value of the target point; calculating 3D coordinate information of the target point according to the depth information of the target point, a first internal parameter of the imaging spectrum device, and first coordinate information of the target point in the target spectral image; determining normal vector information corresponding to the target point according to neighboring points of the target point; inputting the 3D coordinate information and the normal vector information into a full-light model of a diffuse reflecting plate to obtain a second grayscale value; and obtaining reflectance of the diffuse reflecting plate, and calculating reflectance of the target point according to the reflectance of the diffuse reflecting plate, the first grayscale value, and the second grayscale value.

18 Claims, 5 Drawing Sheets

(58) Field of Classification Search

CPC .......... G06T 2207/10012; G01J 3/0278; G01J 3/0297; G01J 3/28; G01J 3/42; G01N 21/25; G06F 18/2135

USPC ........................................................ 382/103

See application file for complete search history.

(56) References Cited

U.S. PATENT DOCUMENTS

| | | | |
|---|---|---|---|
| 2014/0028801 A1* | 1/2014 | Tin ......................... | G01N 21/55 348/136 |
| 2015/0131090 A1* | 5/2015 | Osumi .................. | G01J 3/1256 356/300 |
| 2015/0145966 A1* | 5/2015 | Krieger .............. | A61B 1/00194 348/47 |
| 2016/0173855 A1* | 6/2016 | Michel ................. | H04N 13/204 348/46 |
| 2020/0184665 A1* | 6/2020 | Ikemoto ................. | H04N 23/56 |
| 2021/0004987 A1* | 1/2021 | Matsuura ............... | G06T 7/001 |

FOREIGN PATENT DOCUMENTS

| | | | |
|---|---|---|---|
| CN | 113409379 A | 9/2021 |
| JP | 2006-090897 A | 4/2006 |
| JP | 2011-232268 A | 11/2011 |
| WO | 2008-103486 A1 | 8/2008 |

* cited by examiner

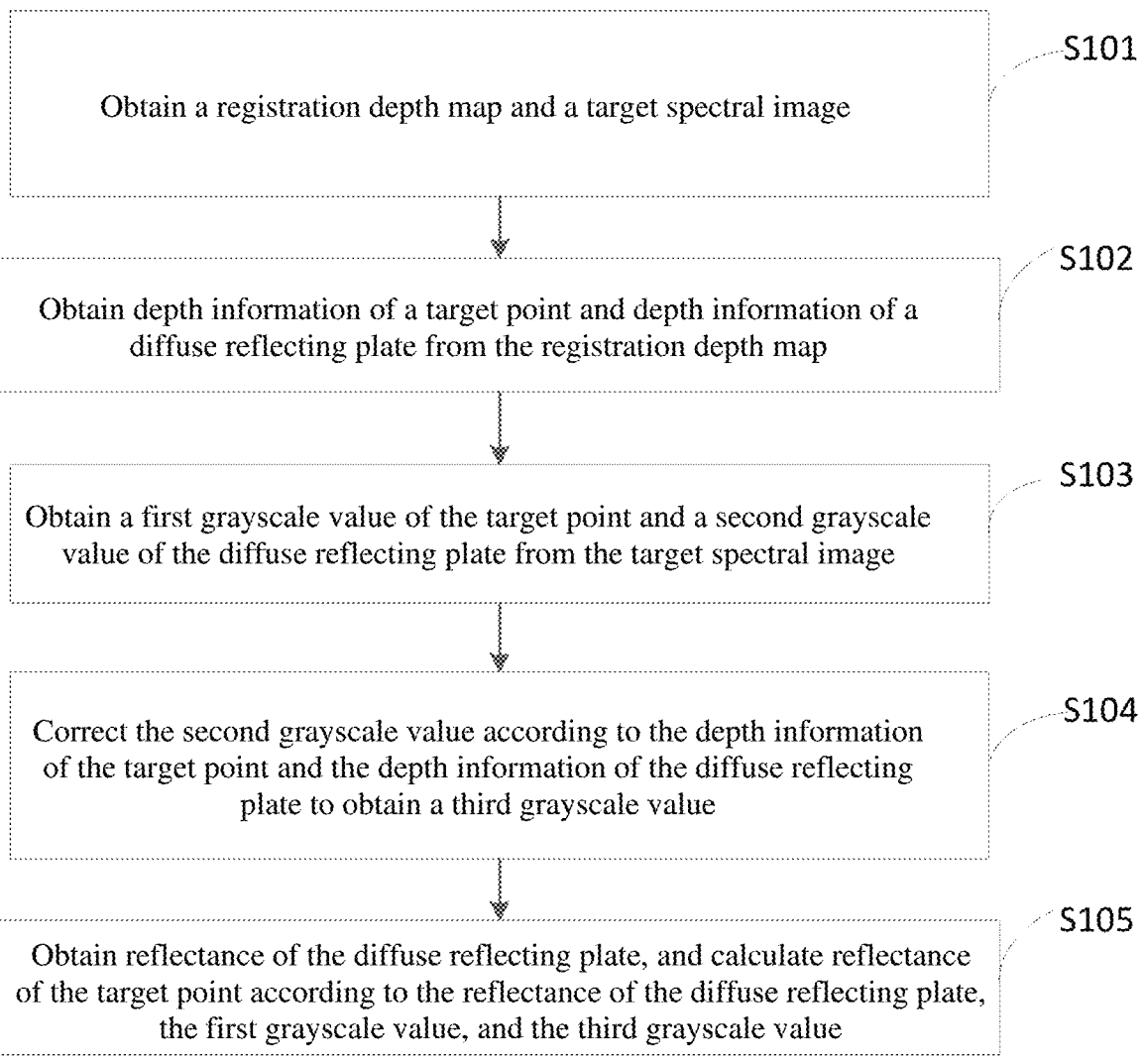

S101

Obtain a registration depth map and a target spectral image

S102

Obtain depth information of a target point and depth information of a
diffuse reflecting plate from the registration depth map

S103

Obtain a first grayscale value of the target point and a second grayscale
value of the diffuse reflecting plate from the target spectral image

S104

Correct the second grayscale value according to the depth information
of the target point and the depth information of the diffuse reflecting
plate to obtain a third grayscale value

S105

Obtain reflectance of the diffuse reflecting plate, and calculate reflectance
of the target point according to the reflectance of the diffuse reflecting plate,
the first grayscale value, and the third grayscale value

FIG. 2

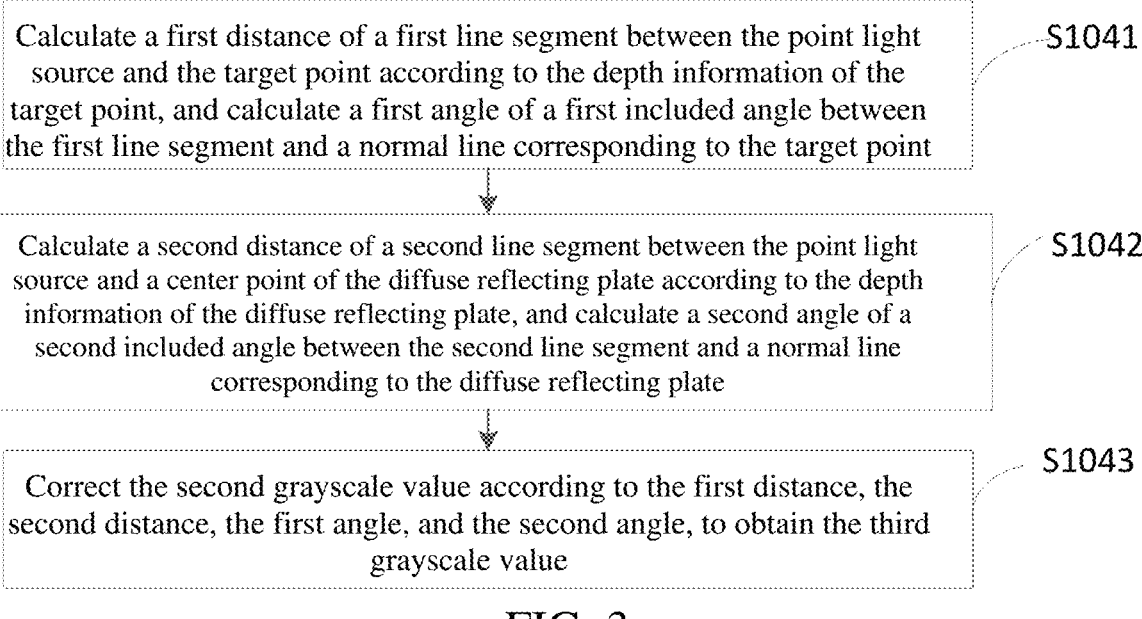

Calculate a first distance of a first line segment between the point light source and the target point according to the depth information of the target point, and calculate a first angle of a first included angle between the first line segment and a normal line corresponding to the target point ⌐S1041

Calculate a second distance of a second line segment between the point light source and a center point of the diffuse reflecting plate according to the depth information of the diffuse reflecting plate, and calculate a second angle of a second included angle between the second line segment and a normal line corresponding to the diffuse reflecting plate ⌐S1042

Correct the second grayscale value according to the first distance, the second distance, the first angle, and the second angle, to obtain the third grayscale value ⌐S1043

FIG. 3

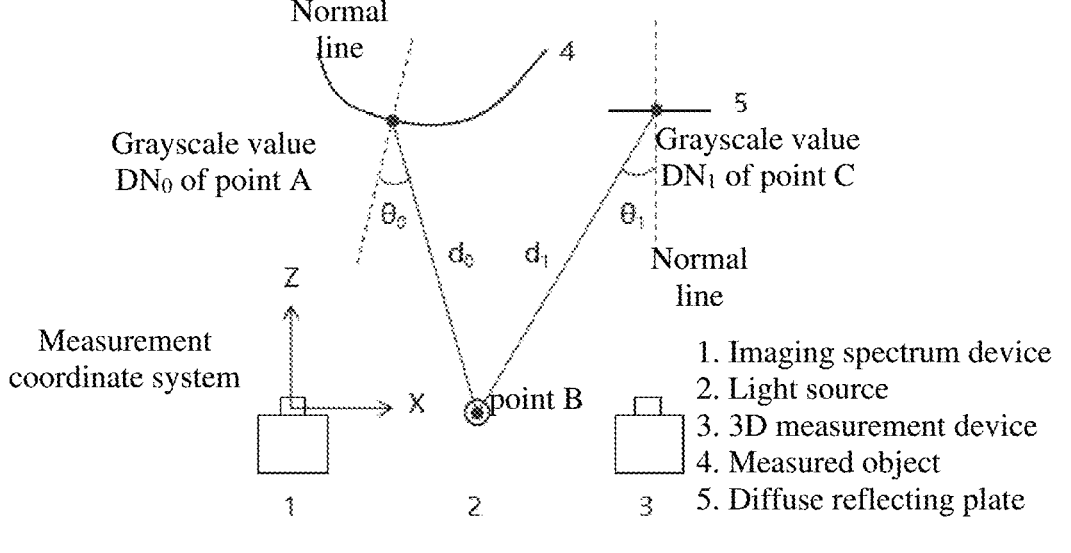

Normal line

Grayscale value DN₀ of point A

Grayscale value DN₁ of point C

Normal line

Measurement coordinate system point B

1. Imaging spectrum device
2. Light source
3. 3D measurement device
4. Measured object
5. Diffuse reflecting plate

FIG. 4

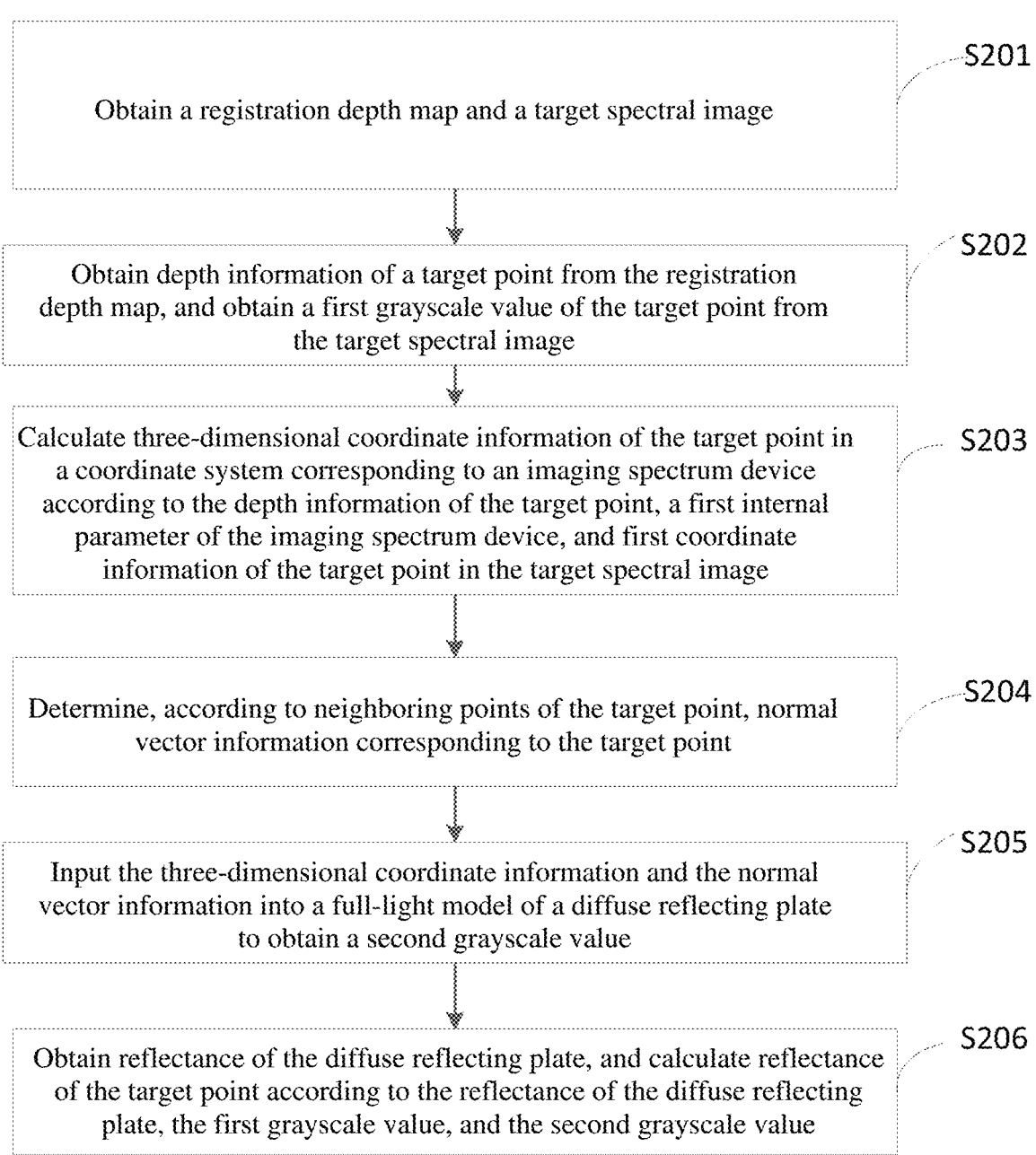

Obtain a registration depth map and a target spectral image

S201

Obtain depth information of a target point from the registration depth map, and obtain a first grayscale value of the target point from the target spectral image

S202

Calculate three-dimensional coordinate information of the target point in a coordinate system corresponding to an imaging spectrum device according to the depth information of the target point, a first internal parameter of the imaging spectrum device, and first coordinate information of the target point in the target spectral image

S203

Determine, according to neighboring points of the target point, normal vector information corresponding to the target point

S204

Input the three-dimensional coordinate information and the normal vector information into a full-light model of a diffuse reflecting plate to obtain a second grayscale value

S205

Obtain reflectance of the diffuse reflecting plate, and calculate reflectance of the target point according to the reflectance of the diffuse reflecting plate, the first grayscale value, and the second grayscale value

METHOD, APPARATUS, AND DEVICE FOR DETERMINING SPECTRAL REFLECTION

CROSS-REFERENCE TO RELATED APPLICATIONS

This application is a Continuation application of International Patent Application No. PCT/CN2022/080525 filed on Mar. 13, 2022, which is based on and claims priority to and benefits of Chinese Patent Application No. 202110754926.X, filed on Jun. 30, 2021. The entire content of all of the above-referenced applications is incorporated herein by reference.

TECHNICAL FIELD

This application pertains to the field of optical technologies, and in particular, to a method, apparatus, and device for determining spectral reflectance.

BACKGROUND

During measurement of spectral reflectance, an indirect measurement method may be used, and the indirect measurement method calculates the spectral reflectance by using a ratio of a target grayscale value detected by a spectral detection device to a grayscale value of a reference diffuse reflecting plate. When the indirect measurement method is used, an important premise is that irradiance received by a to-be-measured object is equal to that received by the diffuse reflecting plate, that is, the diffuse reflecting plate is required to be as close to the to-be-measured object as possible, and thus a final measurement result can be obtained.

However, in a short-distance observation scenario, a structural change of a surface of a to-be-measured object cannot be ignored, and a distance change between different parts of the to-be-measured object and a light source cannot be ignored. In this case, the to-be-measured object cannot be considered as a uniform plane, and therefore, irradiance received at different parts of the to-be-measured object cannot be obtained by using one diffuse reflecting plate fixed in pose. That is, in the actual measurement, the irradiance received by the to-be-measured object and the irradiance received by the diffuse reflecting plate are relatively different in some scenarios, and the difference of irradiance between the diffuse reflecting plate and the surface of the object may lead to an error in calculating spectral reflectance.

SUMMARY

Embodiments of this application provide a method, apparatus, and device for determining spectral reflectance, to resolve the foregoing problem.

According to a first aspect, an embodiment of this application provides a method for determining spectral reflectance, including: obtaining a registration depth map and a target spectral image; obtaining depth information of a target point from the registration depth map, and obtaining a first grayscale value of the target point from the target spectral image; calculating three-dimensional coordinate information of the target point in a coordinate system corresponding to an imaging spectrum device according to the depth information of the target point, a first internal parameter of the imaging spectrum device, and first coordinate information of the target point in the target spectral image; determining, according to neighboring points of the target point, normal vector information corresponding to the target point; inputting the three-dimensional coordinate information and the normal vector information into a full-light model of a diffuse reflecting plate to obtain a second grayscale value; and obtaining reflectance of the diffuse reflecting plate, and calculating reflectance of the target point according to the reflectance of the diffuse reflecting plate, the first grayscale value, and the second grayscale value.

In an embodiment, the obtaining a registration depth map includes: obtaining an initial depth map output by a 3D measurement device; and converting the initial depth map into the registration depth map according to a target external parameter, the first internal parameter of the imaging spectrum device, and a second internal parameter of the 3D measurement device.

In an embodiment, before the obtaining a registration depth map and a target spectral image, the method further includes: obtaining an initial spectral image and a dark field image; and obtaining the target spectral image according to the initial spectral image and the dark field image.

In an embodiment, before the inputting the three-dimensional coordinate information and the normal vector information into a full-light model of a diffuse reflecting plate to obtain a second grayscale value, the method further includes: obtaining sample data of each pose at a target wavelength, wherein the sample data includes a sample grayscale value of a sample point, sample normal vector information, and sample three-dimensional coordinate information; and obtaining the full-light model of the diffuse reflecting plate by performing fitting processing on the sample data.

In an embodiment, the method further includes: determining a spectral reflectance curve of an object according to reflectance of target points in the registration depth map.

In an embodiment, the determining, according to neighboring points of the target point, normal vector information corresponding to the target point includes: determining, according to the neighboring points of the target point, a spatial curved surface formed by the neighboring points, and obtaining, according to the spatial curved surface, the normal vector information corresponding to the target point.

According to a second aspect, an embodiment of this application provides an apparatus for determining spectral reflectance, including: a first obtaining unit, configured to obtain a registration depth map and a target spectral image; a second obtaining unit, configured to obtain depth information of a target point from the registration depth map, and obtain a first grayscale value of the target point from the target spectral image; a first calculation unit, configured to calculate three-dimensional coordinate information of the target point in a coordinate system corresponding to an imaging spectrum device according to the depth information of the target point, a first internal parameter of the imaging spectrum device, and first coordinate information of the target point in the target spectral image; a determining unit, configured to determine, according to neighboring points of the target point, normal vector information corresponding to the target point; a first processing unit, configured to input the three-dimensional coordinate information and the normal vector information into a full-light model of a diffuse reflecting plate to obtain a second grayscale value; and a second calculation unit, configured to: obtain reflectance of the diffuse reflecting plate, and calculate reflectance of the target point according to the reflectance of the diffuse reflecting plate, the first grayscale value, and the second grayscale value.

In an embodiment, the first obtaining unit is configured to: obtain an initial depth map output by a 3D measurement device; and convert the initial depth map into the registration depth map according to a target external parameter, the first internal parameter of the imaging spectrum device, and a second internal parameter of the 3D measurement device.

In an embodiment, the apparatus for determining spectral reflectance further includes: a third obtaining unit, configured to obtain an initial spectral image and a dark field image; and a second processing unit, configured to obtain the target spectral image according to the initial spectral image and the dark field image.

In an embodiment, the apparatus for determining spectral reflectance further includes: a third obtaining unit, configured to obtain sample data of each pose at a target wavelength; where the sample data includes a sample grayscale value of a sample point, sample normal vector information, and sample three-dimensional coordinate information; and a third processing unit, configured to obtain the full-light model of the diffuse reflecting plate by performing fitting processing on the sample data.

In an embodiment, the apparatus for determining spectral reflectance further includes: a fourth processing unit, configured to determine a spectral reflectance curve of an object according to reflectance of target points in the registration depth map.

In an embodiment, the determining unit is configured to: determine, according to the neighboring points of the target point, a spatial curved surface formed by the neighboring points, and obtain, according to the spatial curved surface, the normal vector information corresponding to the target point.

According to a third aspect, an embodiment of this application provides a device for determining spectral reflectance, including a memory, a processor, and a computer program stored in the memory and executable on the processor, where the method for determining spectral reflectance according to the foregoing first aspect is implemented when the processor executes the computer program.

According to a fourth aspect, an embodiment of this application provides a non-transitory computer readable storage medium, where the computer readable storage medium stores a computer program, and the method for determining spectral reflectance according to the foregoing aspect is implemented when the computer program is executed by a processor.

In the embodiments of this application, a registration depth map and a target spectral image are obtained; depth information of a target point is obtained from the registration depth map, and a first grayscale value of the target point is obtained; three-dimensional coordinate information of the target point is calculated according to the depth information of the target point, a first internal parameter of the imaging spectrum device, and first coordinate information of the target point in the target spectral image; normal vector information corresponding to the target point is determined according to neighboring points of the target point; the three-dimensional coordinate information and the normal vector information are input into a preset full-light model of a diffuse reflecting plate to obtain a second grayscale value; and reflectance of the diffuse reflecting plate is obtained, and reflectance of the target point is calculated according to the reflectance of the diffuse reflecting plate, the first grayscale value, and the second grayscale value. In the foregoing method, for an area source or another complex light condition, when spectral reflectance is measured, a grayscale value of a diffuse reflecting plate that has a determined pose is corrected to obtain a "diffuse reflector" that has the same three-dimensional morphology of a to-be-measured object, which is placed in the same position as that of the to-be-measured object. In this case, irradiance received by each part of the "diffuse reflector" is the same as that of irradiance received by the same part of the to-be-measured object, and then the spectral reflectance is calculated. In this way, a large difference between the irradiance received by the to-be-measured object and the irradiance received by the diffuse reflecting plate in some scenarios is avoided, an error that may occur during the calculation of spectral reflectance is further avoided, and a more accurate data source can be provided for a proximity spectral application.

BRIEF DESCRIPTION OF THE DRAWINGS

To describe the technical solutions of the embodiments of this application more clearly, the following briefly introduces the accompanying drawings required for describing the embodiments or the related art. Apparently, the accompanying drawings in the following description show only some embodiments of this application, and a person of ordinary skill in the art may still derive other drawings according to the accompanying drawings without creative efforts.

FIG. 2 is a flowchart of a method for determining spectral reflectance, according to a first embodiment of this application.

FIG. 3 is a flowchart of refinement of S104 in a method for determining spectral reflectance, according to a first embodiment of this application.

FIG. 4 is a schematic diagram of a first line segment and a first included angle in a method for determining spectral reflectance, according to a first embodiment of this application.

FIG. 5 is a flowchart of a method for determining spectral reflectance, according to a second embodiment of this application.

DETAILED DESCRIPTION

In the following description, for the purpose of illustration rather than limitation, details such as the system structure and technology are proposed to thoroughly understand the embodiments of this application. However, a person skilled in the art knows that this application may be implemented in other embodiments without these details.

It is to be understood that when used in the specification of this application and the appended claims, the term "include" indicates the presence of described features, wholes, steps, operations, elements and/or components, but do not exclude the presence or addition of one or more of other features, wholes, steps, operations, elements, components and/or a set thereof.

It is to be further understood that a term "and/or" used in the specification of this application and the appended claims refers to one or more of any and all possible combinations of the associated items that is listed and includes the combinations.

In addition, in the specification of this application and the appended claims, terms "first", "second", and "third" are only used to distinguish the description and cannot be understood as indicating or implying relative importance.

Referring to "one embodiment", "some embodiments", or the like described in the specification of this application means that specific features, structures, or characteristics described with reference to the embodiments are included in one or more embodiments of this application. Therefore, the statements "in one embodiment", "in some embodiments", "in some other embodiments", and the like that appear in different parts of the specification do not necessarily refer to the same embodiments, but mean "one or more but not all embodiments" unless otherwise emphasized. The terms "include", "contain", "have", and their variations mean "include but not be limited to" unless otherwise emphasized.

During measurement of spectral reflectance, the following methods can be used: direct measurement method and indirect measurement method.

The direct measurement method is generally used in a laboratory. During the direct measurement, an experimental environment and an experimental condition are precisely controlled, reflected optical power and received optical power of each wavelength on a target surface are measured by using a precise optical instrument, and spectral reflectance is calculated by using a ratio of the reflected optical power to the received optical power. The direct measurement method has a harsh measurement requirement, and is not widely used.

Figure 1:
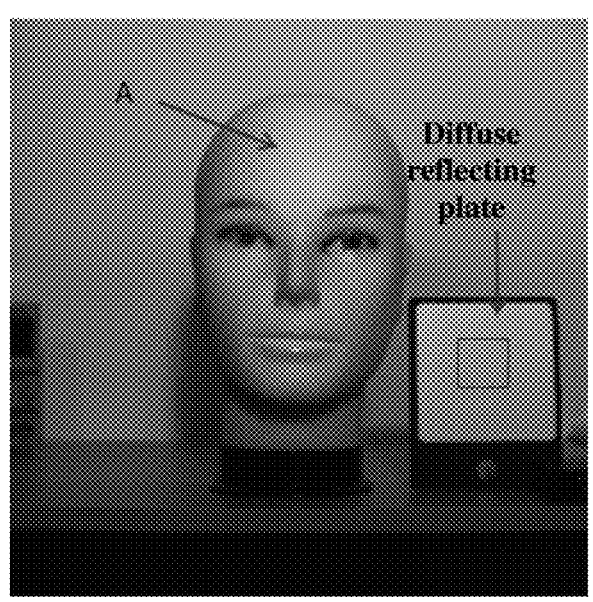
FIG. 1 is a schematic diagram of a photographing scenario of a prosthetic face, according to an embodiment of this application.

The indirect measurement method directly calculates spectral reflectance by using a ratio of a target grayscale value (DN value) detected by a spectral detection device to a grayscale value of a reference diffuse reflecting plate. The indirect measurement method is widely used because it is easy to operate and has low requirements on a measurement environment and device. For example, FIG. 1 is a photographing scenario (700 nm image) of a prosthetic face, and a spectral image of each wave band of the scenario is photographed by using an imaging spectrometer. In addition to a to-be-measured object, a diffuse reflecting plate is disposed near the to-be-measured object. The diffuse reflecting plate has the Lambert emission characteristic, reflectance of the diffuse reflecting plate is known, and reflected brightness in each direction is the same. To calculate a reflectance curve of a point A on the forehead of the prosthetic face, the following operations are performed:

1) Photograph and obtain scenario data by using an imaging spectrometer, to obtain a spectral image of each wave band;

2) Shield an imaging spectrometer lens, and photograph and obtain dark field data to obtain a dark field image of each wave band;

3) Using 700 nm in the figure as an example, read a grayscale value of the point A in the 700 nm spectral image, which is assumed to be 112; and read a grayscale value of the point A in the 700 nm dark field image, which is assumed to be 12;

4) Calculate an average grayscale value of a diffuse reflecting plate area in the 700 nm spectral image, which is assumed to be 210; and calculate an average grayscale value of a diffuse reflecting plate area in the 700 nm dark field image, which is assumed to be 10;

5) If reflectance of the diffuse reflecting plate at 700 nm is known to be 98%, reflectance of the point A at 700 nm is (112−12)/(210−10)*98%=79%.

The foregoing steps 3 to 5 are repeated on the spectral image of each wavelength, that is, reflectance data of the point A at each wavelength is obtained.

The foregoing process may be represented by using the following formula:

$$\frac{\rho_0}{\rho_1} = \frac{DN_0}{DN_1},$$

ρ: Reflectance,
0: To-be-measured object,
1: Reference diffuse reflecting plate, and
$DN_0$ and $DN_1$ are grayscale values after the dark background is subtracted.

The indirect measurement method calculates the reflectance by using the ratio of the grayscale values. Theoretical derivation of the indirect measurement method is as follows:

$$\frac{DN_0}{DN_1} = \frac{k_e E_{s0}}{k_e E_{s1}} = \frac{k_e k_l L_0}{k_e k_l L_1} = \frac{k_e k_l \frac{M_0}{\pi}}{k_e k_l \frac{M_1}{\pi}} = \frac{k_e k_l \frac{\rho_0 E_0}{\pi}}{k_e k_l \frac{\rho_1 E_1}{\pi}} \approx \frac{\rho_0}{\rho_1},$$

$E_s$: Irradiance at a pixel on a sensor surface,
L: Object radiance,
M: Object radiant exitance, and
E: Object surface irradiance.

It can be learned from the foregoing formula that, in the indirect measurement method, there is an important assumption that the irradiance $E_0$ received by the to-be-measured object is equal to the irradiance $E_1$ received by the diffuse reflecting plate. This is also a reason why the diffuse reflecting plate in the indirect measurement method is as close to the object as possible.

However, in the actual measurement, the foregoing assumption is not always valid, that is, the irradiance received by the to-be-measured object is different from that received by the diffuse reflecting plate in some scenarios.

In a large-scale observation scenario, such as satellite observation and unmanned aerial vehicle observation in a remote measurement scenario or a remote sensing scenario, a structure change of a surface of a to-be-measured object is omitted because of the scale, and only a macro observation characteristic is displayed. The surface of the to-be-measured object may be considered as a uniform plane. In addition, because the distance between the to-be-measured object and a light source (such as the sun) is far, light in the scenario is relatively uniform. In this case, the diffuse reflecting plate is disposed near the to-be-measured object, and the diffuse reflecting plate and the to-be-measured object may be considered to receive the same irradiance.

However, in a short-distance observation scenario, a structure change of a surface of a to-be-measured object cannot be ignored, and a distance change between a light source and different parts of the to-be-measured object cannot be ignored. In this case, the to-be-measured object cannot be considered as a uniform plane, therefore, irradiance received at different parts of the to-be-measured object cannot be obtained by using one diffuse reflecting plate with the fixed location and pose.

That is, in the actual measurement, the irradiance received by the to-be-measured object and the irradiance received by the diffuse reflecting plate are different in some scenarios, and the difference of the irradiance between the diffuse reflecting plate and the surface of the object may lead to an error in calculating spectral reflectance.

To resolve this problem, in an embodiment, a method for determining spectral reflectance is proposed. FIG. 2 is a flowchart of a method for determining spectral reflectance, according to a first embodiment of this application. In an embodiment, an execution body of the method for determining spectral reflectance is a device that has a function for determining spectral reflectance.

Before the method for determining spectral reflectance is described in detail, a hardware device used to implement the method is first described, and includes an imaging spectrum device, a 3D measurement device, and a lighting device.

The imaging spectrum device may be an imaging spectrometer, such as an optical grating type, a rotation filter type, or a picture frame type imaging spectrometer. The imaging spectrum device may be a new type of imaging spectrometer, such as a filter array type imaging spectrometer. The feature of the imaging spectrum device is that a spectral image of each wave band/channel can be output.

The 3D measurement device may be a structured light sensor, a TOF sensor, a binocular sensor, or the like. The feature of the 3D measurement device is that a depth image can be output.

The lighting device may be a point light source, has a relatively small geometric size, and uniformly illuminates in all directions of space, or may be an area light source or a complex form of light source, or even a combination of various complex light sources. The light source needs to keep a stable luminous intensity or a stable light source combination during the measurement. In an embodiment, the lighting device is a point light source.

Before the method in the embodiment is implemented, hardware are to be calibrated, and an internal parameter of the 3D measurement device, an internal parameter of the imaging spectrum device, and external parameters of the two devices are calibrated by using a camera calibration method, to accurately measure distance information between the point light source and the imaging spectrum device, that is, a translation vector in a measurement coordinate system from the light source to the imaging spectrum device. After the calibration is complete, a relative pose between the three devices is kept unchanged throughout a determining period of spectral reflectance.

The method for determining spectral reflectance shown in FIG. 2 may include the following steps.

S101: Obtaining a registration depth map and a target spectral image.

The device obtains the registration depth map and the target spectral image. The registration depth map is a depth map observed and obtained by the imaging spectrum device. The target spectral image may be a spectral image obtained after dark field data is subtracted.

For example, when obtaining the registration depth map, the device obtains an initial depth map output by the 3D measurement device, and converts the initial depth map into the registration depth map according to a target external parameter, the first internal parameter of the imaging spectrum device, and a second internal parameter of the 3D measurement device. A target external parameter, a first internal parameter of the imaging spectrum device, and a second internal parameter of the 3D measurement device are obtained by the calibration when the hardware is calibrated.

The target external parameter is information about a distance between the point light source and the imaging spectrum device, that is, a translation vector in the measurement coordinate system from the light source to the imaging spectrum device. The device converts the initial depth map output by the 3D measurement device into the registration depth map observed and obtained by the imaging spectrum device, to implement the pixel-by-pixel registration between the spectral data and 3D data.

During the conversion, the following formula may be used to convert a depth value corresponding to each point in the initial depth map.

$$
\begin{bmatrix} u_s \\ v_s \\ 1 \end{bmatrix} = \frac{1}{d_s} K_s \left( R_{d2s} \cdot d_d \cdot K_d^{-1} \begin{bmatrix} u_d \\ v_d \\ 1 \end{bmatrix} + T_{d2s} \right),
$$

$K_d$ is the second internal parameter of the 3D measurement device, $K_s$ is the first internal parameter of the imaging spectrum device, and the target external parameter includes a rotation matrix and a translation vector that are from the 3D measurement device to the spectrum measurement device, which are respectively denoted as $R_{d2s}$ and $T_{d2s}$. $d_d$ is a depth value corresponding to a point $[u_d, v_d]$ in the initial depth map output by the 3D measurement device, and may be read from the initial depth map. $d_s$ is a depth value of a corresponding point $[u_s, v_s]$ in the converted registration depth map of the imaging spectrum device. By traversing the initial depth map according to the foregoing formula, a registration depth map corresponding to the target spectral image output by the imaging spectrum device pixel by pixel may be obtained, to implement the registration between depth image data and spectral image data.

When obtaining the target spectral image, the device may obtain an initial spectral image and a dark field image, and obtain the target spectral image according to the initial spectral image and the dark field image. For example, after the light source illuminates stably, a spectral image of the scenario is collected by using the imaging spectrometer. An imaging spectrometer lens is shielded, and dark field data is photographed to obtain a dark field image. Dark field data of a dark field image of a corresponding wave band is subtracted from the image data of an initial spectral image of each wave band, to obtain the target spectral image.

S102: Obtaining depth information of a target point and depth information of a diffuse reflecting plate from the registration depth map.

The device obtains the depth information of the target point and the depth information of the diffuse reflecting plate from the registration depth map. For example, the depth information of the target point and the depth information of the diffuse reflecting plate may be directly read from the registration depth map. For example, assuming that coordinates of the point A in the target spectral image are (m, n), a depth value of a point whose coordinates are (m, n) in the registration depth map is directly read, that is, the depth information of the point A.

The target point is any point on the to-be-measured object in a target spectral image of a wave band.

S103: Obtaining a first grayscale value of the target point and a second grayscale value of the diffuse reflecting plate from the target spectral image.

The device obtains the first grayscale value of the target point and the second grayscale value of the diffuse reflecting plate from the target spectral image, and the first grayscale value of the target point and the second grayscale value of the diffuse reflecting plate may be directly read from the target spectral image.

S104: Correcting the second grayscale value according to the depth information of the target point and the depth information of the diffuse reflecting plate to obtain a third grayscale value.

The device corrects the second grayscale value according to the depth information of the target point and the depth information of the diffuse reflecting plate to obtain the third grayscale value. The device may calculate three-dimensional coordinates of the target point and three-dimensional coordinates of the diffuse reflecting plate according to the depth information of the target point and the depth information of the diffuse reflecting plate, and then the device obtains three-dimensional coordinates of points in a neighborhood of the target point, and corrects the second grayscale value by using the three-dimensional coordinates of these points to obtain a corrected third grayscale value.

It should be noted that, a principle of correcting the grayscale value of the diffuse reflecting plate by using the three-dimensional coordinate data is a distance inverse-square law of irradiance of a point light source, which is described as follows.

If the intensity of radiation of the point light source to the space is known to be I, irradiance received on a surface of an object is inversely proportional to the distance between the object and the point light source, and is directly proportional to the cosine of the angle between the lighting direction and the normal line. It can be learned from this that, because distances from point C and point A to the light source are different, and the angles between the lighting direction and the normal line of the two points are different, the irradiance received at the point C is different from the irradiance received at the point A. Therefore, an error may exist in calculating reflectance using a grayscale value observed at the point C. The grayscale value of the point C may be corrected by using the three-dimensional coordinate data.

This problem may be described as, when a grayscale value of the diffuse reflecting plate observed at a known pose is known, how to obtain a grayscale value of the diffuse reflecting plate at a specified pose (same as a pose of the target point A). By using the distance inverse-square law of the irradiance of the point light source, a correction coefficient of irradiance of the diffuse reflecting plate after a pose change can be obtained. Because of a positive proportional relationship between the irradiance and the grayscale value, this coefficient is a correction coefficient of the observed grayscale value.

For example, S104 may include S1041-S1043. As shown in FIG. 3, S1041-S1043 are as follows.

S1041: Calculating a first distance of a first line segment between the point light source and the target point according to the depth information of the target point, and calculating a first angle of a first included angle between the first line segment and a normal line corresponding to the target point.

The device calculates the first distance of the first line segment between the point light source and the target point according to the depth information of the target point, and calculate the first angle of the first included angle between the first line segment and the normal line corresponding to the target point. For example, as shown in FIG. 4, the point A is the target point, the point B is the point light source, and the point C is a center point of the diffuse reflecting plate. The line segment AB is the first line segment between the point light source and the target point, the first distance of the first line segment AB is denoted as do, and the first included angle between the first line segment AB and the normal line corresponding to the target point A is denoted as 60.

For example, the device calculates the first distance of the first line segment between the point light source and the target point according to the depth information of the target point. The device may calculate coordinates of the point light source and the target point, and obtain the first distance according to coordinate information of the two. The device calculates first three-dimensional coordinates of the target point in a coordinate system corresponding to the imaging spectrum device according to the depth information of the target point, the first internal parameter of the imaging spectrum device, and first coordinate information of the target point in the target spectral image. For example, the following formula may be used:

$$\begin{bmatrix} X \\ Y \\ Z \end{bmatrix} = d_z \cdot K_s^{-1} \begin{bmatrix} u_s \\ v_s \\ 1 \end{bmatrix},$$

(X, Y, Z) is the first three-dimensional coordinates of the target point in the coordinate system corresponding to the imaging spectrum device, $(u_s, v_s)$ is image coordinates of the point in the target spectral image, $K_s$ is the first internal parameter of the imaging spectrum device, and $d_s$ is the depth value of the point.

Similarly, the device obtains the depth information of the point light source from the registration depth map, and calculates second three-dimensional coordinates of the point light source in the coordinate system corresponding to the imaging spectrum device according to the depth information of the point light source, the first internal parameter of the imaging spectrum device, and second coordinate information of the point light source in the target spectral image. For a method for calculating the second three-dimensional coordinates, refer to related descriptions in the method for calculating the first three-dimensional coordinates. Details are not described herein again.

After the first three-dimensional coordinates and the second three-dimensional coordinates are calculated, the device calculates the first distance between the point light source and the target point according to the first three-dimensional coordinates and the second three-dimensional coordinates. For example, if coordinates (X, Y, Z) of the point A of the target point are known, and coordinates (X1, Y1, Z1) of the point light source B are also known, the first distance $d_0 = |AB| = [(X-X_1)^2 + (Y-Y_1)^2 + (Z-Z_1)^2]^{1/2}$.

When calculating the first angle of the first included angle between the first line segment and the normal line corresponding to the target point, the device obtains a spatial curved surface formed by the neighboring points of the target point, and obtains, according to the spatial curved surface, a normal vector corresponding to the target point; calculates a target vector between the point light source and the target point according to the first three-dimensional coordinates and the second three-dimensional coordinates; and determines, according to the normal vector and the target vector, the first angle of the first included angle between the first line segment and the normal line corresponding to the target point.

For example, the device first obtains the neighboring points of the target point and a neighborhood of the target point, which is not limited. For example, the device may select the target point as a center, a 21*21 pixel window, a 31*31 pixel, or a 71*71 pixel as the neighborhood of the target point. When the neighborhood is determined, a window whose width is an odd number is generally selected. A spatial curved surface formed by the neighboring points of the target point is a surface profile formed by these neighboring points. For example, the spatial curved surface may be determined by determining the three-dimensional coordinates of these neighboring points. For a method for calculating the three-dimensional coordinates of the neighboring points herein, refer to the foregoing method for calculating the first three-dimensional coordinates. Details are not described herein again. The depth value of the neighborhood is also read from the registration depth map according to the pixel coordinates of the neighborhood. It is assumed that the point A is selected as the center in the target spectral image, and a window of 21*21 is used as the neighborhood of the point A. In this case, three-dimensional coordinates of each neighboring point in the neighborhood are traversed and solved, and finally obtained three-dimensional coordinates of 441 points forming the point cloud data of the neighborhood of the point A, that is, the spatial curved surface formed by the neighboring points of the target point.

Then, the device may perform analysis and calculation on the spatial curved surface according to a principal component analysis algorithm to obtain the normal vector corresponding to the target point. The device calculates a target vector $AB=(X_1-X, Y_1-Y, Z_1-Z)$ between the point light source and the target point according to the first three-dimensional coordinates and the second three-dimensional coordinates.

The device determines, according to the normal vector and the target vector, the first angle between the first line segment and the normal line corresponding to the target point, where the normal vector is n, and the target vector is m, the first angle $\theta_0=\arccos(m*n/|m||n|)$ of the first included angle.

S1042: Calculating a second distance of a second line segment between the point light source and a center point of the diffuse reflecting plate according to the depth information of the diffuse reflecting plate, and calculating a second angle of a second included angle between the second line segment and a normal line corresponding to the diffuse reflecting plate.

In S1042, for details of calculation methods of the second distance and the second angle, refer to related descriptions in S1071. Details are not described herein again.

A method similar to that in S1041 is used to obtain the second line segment and the second angle $\theta_1$ of the second included angle.

S1043: Correcting the second grayscale value according to the first distance, the second distance, the first angle, and the second angle, to obtain the third grayscale value.

The device corrects the second grayscale value according to the first distance, the second distance, the first angle, and the second angle to obtain the third grayscale value, which may be corrected according to the following formula:

$$DN_2 = \frac{d_1^2\cos\theta_0}{d_0^2\cos\theta_1}DN_1,$$

$DN_2$ is the third grayscale value, $DN_1$ is the second grayscale value, $\theta_0$ is the first angle, $\theta_1$ is the second angle, $d_0$ is the first distance, and $d_1$ is the second distance.

S105: Obtaining reflectance of the diffuse reflecting plate, and calculating reflectance of the target point according to the reflectance of the diffuse reflecting plate, the first grayscale value, and the third grayscale value.

The device obtains the reflectance of the diffuse reflecting plate, and calculates the reflectance of the target point according to the reflectance of the diffuse reflecting plate, the first grayscale value $DN_0$, and the third grayscale value. It is known that the reflectance of the diffuse reflecting plate is $\rho_r$, the reflectance $\rho_A$ of the target point is calculated by using the corrected second grayscale value $DN_2$ as follows:

$$\rho_A = \frac{DN_0}{DN_2}\rho_r.$$

The device may perform the foregoing calculation on each target point on the to-be-measured object to obtain reflectance of all the target points, and repeat the foregoing operations on all wave bands. Then, the device determines, according to the reflectance of all the target points, a spectral reflectance curve of all points of the to-be-measured object.

In an embodiment of this application, a registration depth map and a target spectral image are obtained; depth information of a target point and depth information of a diffuse reflecting plate are obtained from the registration depth map; a first grayscale value of the target point and a second grayscale value of the diffuse reflecting plate are obtained from the target spectral image; the second grayscale value is corrected according to the depth information of the target point and the depth information of the diffuse reflecting plate to obtain a third grayscale value; and reflectance of the diffuse reflecting plate is obtained, and reflectance of the target point is calculated according to the reflectance of the diffuse reflecting plate, the first grayscale value, and the third grayscale value. In the foregoing method, when the lighting device is a point light source, when spectral reflectance is measured, a grayscale value of a diffuse reflecting plate that has a determined pose is corrected to obtain a "diffuse reflector" that has the same three-dimensional morphology of a to-be-measured object, which is placed in the same position as that of the to-be-measured object. In this case, irradiance received by each part of the "diffuse reflector" is the same as that of irradiance received by the same part of the to-be-measured object, and then the spectral reflectance is calculated. In this way, a large difference between the irradiance received by the to-be-measured object and the irradiance received by the diffuse reflecting plate is avoided in some scenarios, an error that may occur during the calculation of spectral reflectance is further avoided, and a more accurate data source can be provided for a proximity spectral application.

In the foregoing embodiment, the method in which the lighting device is a point light source is provided. For an area light source or another complex light condition, the reflectance of the target point may be determined in the following manner. FIG. 5 is a flowchart of a method for determining spectral reflectance, according to a second embodiment of this application. In an embodiment, an execution body of the method for determining spectral reflectance is a device that has a function for determining spectral reflectance.

In an embodiment, a hardware device and a hardware calibration manner used are the same as those in the first embodiment, and details are not described herein again.

The method for determining spectral reflectance shown in FIG. 5 may include the following steps.

S201: Obtaining a registration depth map and a target spectral image.

The device obtains the registration depth map and the target spectral image. The registration depth map is a depth map observed and obtained by the imaging spectrum device. The target spectral image may be a spectral image obtained after dark field data is subtracted.

For example, when the registration depth map is obtained, an initial depth map output by the 3D measurement device is obtained, and the initial depth map is converted into the registration depth map according to a target external parameter, the first internal parameter of the imaging spectrum device, and a second internal parameter of the 3D measurement device.

When obtaining the target spectral image, the device obtains an initial spectral image and a dark field image, and obtains the target spectral image according to the initial spectral image and the dark field image.

A manner of obtaining the registration depth map and the target spectral image in S201 is similar to that in S101 in the first embodiment. For details, refer to related descriptions in S101. Details are not described herein again.

S202: Obtaining depth information of a target point from the registration depth map, and obtaining a first grayscale value of the target point from the target spectral image.

The device selects the target point, where the target point is any point on the to-be-measured object in a target spectral image of a wave band. The device obtains the depth information of the target point from the registration depth map. For example, the depth information of the target point may be directly read from the registration depth map. For example, assuming that coordinates of the point A in the target spectral image are (m, n), a depth value of a point whose coordinates are (m, n) in the registration depth map is directly read, that is, the depth information of the point A.

The device obtains the first grayscale value of the target point from the target spectral image, and the first grayscale value of the target point may be directly read from the target spectral image.

S203: Calculating three-dimensional coordinate information of the target point in a coordinate system corresponding to an imaging spectrum device according to the depth information of the target point, a first internal parameter of the imaging spectrum device, and first coordinate information of the target point in the target spectral image.

In S203, a method for calculating the three-dimensional coordinate information of the target point in the coordinate system corresponding to the imaging spectrum device is similar to the method for calculating the first three-dimensional coordinate of the target point in the coordinate system corresponding to the imaging spectrum device according to the depth information of the target point, the first internal parameter of the imaging spectrum device, and the first coordinate information of the target point in the target spectral image in S1071 in the first embodiment. References may be made to related descriptions in the S1071, and details are not described herein again.

S204: Determining, according to neighboring points of the target point, normal vector information corresponding to the target point. The device determines, according to the neighboring points of the target point, the normal vector information corresponding to the target point. The device first determines neighboring points of the target point and a neighborhood of the target point, which is not limited. For example, the device may select the target point as a center, a 21*21 pixel window, a 31*31 pixel, or a 71*71 pixel as the neighborhood of the target point. When the neighborhood is determined, a window whose width is an odd number is generally selected.

The device may determine, according to the neighboring points of the target point, the normal vector information corresponding to the target point, and may calculate coordinates of the neighboring points by using a preset algorithm, to obtain the normal vector information corresponding to the target point.

For example, the device determines, according to the neighboring points of the target point, a spatial curved surface formed by the neighboring points, and obtains, according to the spatial curved surface, the normal vector information corresponding to the target point. A spatial curved surface formed by the neighboring points of the target point is a surface profile formed by these neighboring points. For example, the spatial surface may be determined by determining three-dimensional coordinates of these neighboring points. For a method for calculating the three-dimensional coordinates of the neighboring points herein, refer to the method for calculating the first three-dimensional coordinates in the first embodiment. Details are not described herein again. The device may perform analysis and calculation on the spatial curved surface according to a principal component analysis algorithm to obtain the normal vector information corresponding to the target point.

S205: Inputting the three-dimensional coordinate information and the normal vector information into a preset full-light model of a diffuse reflecting plate to obtain a second grayscale value.

The device stores the preset full-light model of the diffuse reflecting plate, where input to the preset full-light model of the diffuse reflecting plate is the three-dimensional coordinate information and the normal vector information, and output of the three-dimensional coordinate information and the normal vector information is a corrected second grayscale value. The preset full-light model of the diffuse reflecting plate may be directly trained by the device in advance, or may be transplanted into a local device after another device completes training the preset full-light model in advance.

The device inputs the three-dimensional coordinate information and the normal vector information into the preset full-light model of the diffuse reflecting plate to obtain the second grayscale value. The second grayscale value is an observed grayscale value of a diffuse reflecting plate whose distance and pose are the same as those of the target point A under a current complex light condition.

In an embodiment, the device may perform modeling in advance, and obtain the preset full-light model of the diffuse reflecting plate by fitting the obtained data. In the modeling phase, a wavelength is first fixed as a target wavelength, and data of a pose is obtained. The device obtains sample data of each preset pose at the target wavelength, and performs fitting processing on the sample data to obtain the preset full-light model of the diffuse reflecting plate.

The sample data includes a sample grayscale value of a sample point, sample normal vector information, and sample three-dimensional coordinate information. Using the center point C of the diffuse reflecting plate as an example, a sample grayscale value DN of the center point C of the diffuse reflecting plate, sample three-dimensional coordinate information (X, Y, Z) of the center point C of the diffuse reflecting plate, and sample normal vector information [m, n, k] of the diffuse reflecting plate are extracted to obtain a group of data [DN, X, Y, Z, m, n, k]. Data of each preset pose at the wavelength is extracted. All these data is used to fit the relationship between the sample grayscale value DN of the diffuse reflecting plate and (X, Y, Z, m, n, k). A specific form of a fitting function is not limited, and may be collectively represented as follows:

$$DN=F(X,Y,Z,m,n,k).$$

That is, when the light condition is fixed, given any distance and pose of the diffuse reflecting plate, the model may output an observed grayscale value of the imaging spectrometer for the diffuse reflecting plate at the pose. The foregoing operation is performed on all wave bands in which the imaging spectrometer works, to obtain a full-light model of the diffuse reflecting plate, that is, the preset full-light model of the diffuse reflecting plate.

S206: Obtaining reflectance of the diffuse reflecting plate, and calculating reflectance of the target point according to the reflectance of the diffuse reflecting plate, the first grayscale value, and the second grayscale value.

The device obtains the reflectance of the diffuse reflecting plate, and calculates the reflectance of the target point according to the reflectance of the diffuse reflecting plate, the first grayscale value $DN_0$, and the second grayscale value $DN_2$. It is known that the reflectance of the diffuse reflecting plate is $\rho_r$, the reflectance $\rho_A$ of the target point is calculated by using the corrected second grayscale value $DN_2$ as follows:

$$\rho_A = \frac{DN_0}{DN_2}\rho_r.$$

The device may perform the foregoing calculation on each target point on the to-be-measured object to obtain reflectance of all the target points, and repeat the foregoing operations on all wave bands. Then, the device determines, according to the reflectance of all the target points, a spectral reflectance curve of all points of the to-be-measured object.

In an embodiment of this application, a registration depth map and a target spectral image are obtained; depth information of a target point is obtained from the registration depth map, and a first grayscale value of the target point is obtained; three-dimensional coordinate information of the target point is calculated according to the depth information of the target point, a first internal parameter of the imaging spectrum device, and first coordinate information of the target point in the target spectral image; normal vector information corresponding to the target point is determined according to neighboring points of the target point; the three-dimensional coordinate information and the normal vector information are input into a preset full-light model of a diffuse reflecting plate to obtain a second grayscale value; and reflectance of the diffuse reflecting plate is obtained, and reflectance of the target point is calculated according to the reflectance of the diffuse reflecting plate, the first grayscale value, and the second grayscale value. In the foregoing method, for an area source or another complex light condition, when spectral reflectance is measured, a grayscale value of a diffuse reflecting plate that has a determined pose is corrected to obtain a "diffuse reflector" that has the same three-dimensional morphology of a to-be-measured object, which is placed in the same position as that of the to-be-measured object. In this case, irradiance received by each part of the "diffuse reflector" is the same as that of irradiance received by the same part of the to-be-measured object, and then the spectral reflectance is calculated. In this way, a large difference between the irradiance received by the to-be-measured object and the irradiance received by the diffuse reflecting plate is avoided in some scenarios, an error that may occur during the calculation of spectral reflectance is further avoided, and a more accurate data source can be provided for a proximity spectral application.

It is to be understood that the order of the sequence numbers of the steps in the foregoing embodiments does not limit the order of execution, and the execution order of each process is determined by its function and inherent logic, and does not limit the implementation process of the embodiments of this application.

Figure 6:
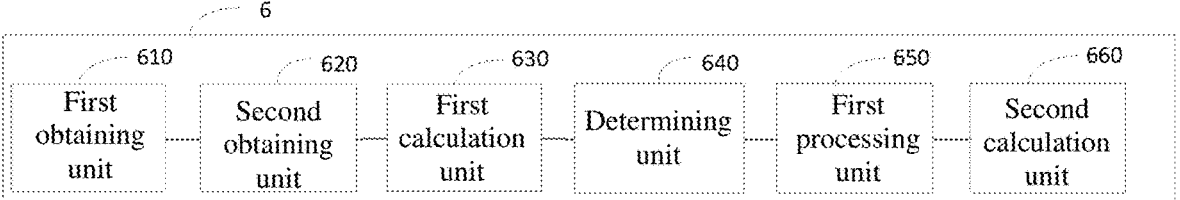
FIG. 6 is a schematic diagram of a device for determining spectral reflectance, according to a third embodiment of this application.

FIG. 6 is a schematic diagram of a device for determining spectral reflectance, according to a third embodiment of this application. Included units are configured to perform the steps in the embodiment corresponding to FIG. 5. For details, refer to related descriptions in the embodiment corresponding to FIG. 5. For ease of description, only a part related to the embodiment is shown.

Referring to FIG. 6, a device 6 for determining spectral reflectance includes: a first obtaining unit 610, configured to obtain a registration depth map and a target spectral image; a second obtaining unit 620, configured to obtain depth information of a target point from the registration depth map, and obtain a first grayscale value of the target point from the target spectral image; a first calculation unit 630, configured to calculate three-dimensional coordinate information of the target point in a coordinate system corresponding to an imaging spectrum device according to the depth information of the target point, a first internal parameter of the imaging spectrum device, and first coordinate information of the target point in the target spectral image; a determining unit 640, configured to determine, according to neighboring points of the target point, normal vector information corresponding to the target point; a first processing unit 650, configured to input the three-dimensional coordinate information and the normal vector information into a preset full-light model of a diffuse reflecting plate to obtain a second grayscale value; and a second calculation unit 660, configured to: obtain reflectance of the diffuse reflecting plate, and calculate reflectance of the target point according to the reflectance of the diffuse reflecting plate, the first grayscale value, and the second grayscale value.

In an embodiment, the first obtaining unit 610 is configured to obtain an initial depth map output by a 3D measurement device; and convert the initial depth map into the registration depth map according to a target external parameter, the first internal parameter of the imaging spectrum device, and a second internal parameter of the 3D measurement device.

In an embodiment, the device 6 for determining spectral reflectance further includes: a third obtaining unit, configured to obtain an initial spectral image and a dark field image; and a second processing unit, configured to obtain the target spectral image according to the initial spectral image and the dark field image.

In an embodiment, the device 6 for determining spectral reflectance further includes: a third obtaining unit, configured to obtain sample data of each preset pose at a target wavelength, wherein the sample data includes a sample grayscale value of a sample point, sample normal vector information, and sample three-dimensional coordinate information; and a third processing unit, configured to perform fitting processing on the sample data to obtain the preset full-light model of the diffuse reflecting plate.

In an embodiment, the device 6 for determining spectral reflectance further includes: a fourth processing unit, configured to determine a spectral reflectance curve of a to-bemeasured object according to reflectance of all target points in the registration depth map.

In an embodiment, the determining unit 640 is configured to: determine, according to the neighboring points of the target point, a spatial curved surface formed by the neighboring points, and obtain, according to the spatial curved surface, the normal vector information corresponding to the target point.

Figure 7:
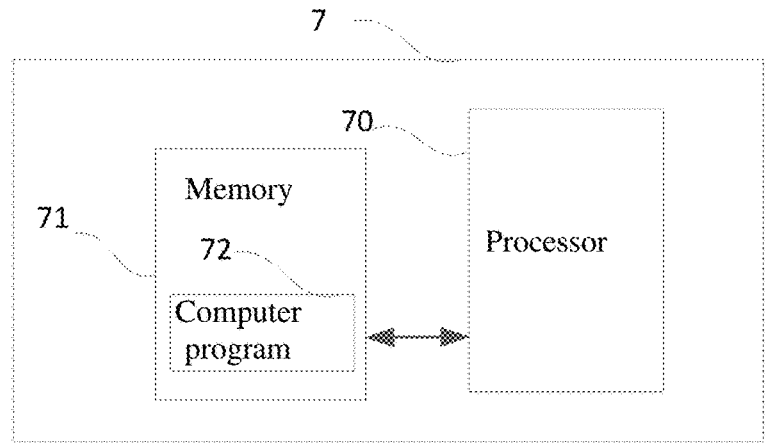
FIG. 7 is a schematic diagram of a device for determining spectral reflectance, according to a fourth embodiment of this application.

FIG. 7 is a schematic diagram of a device for determining spectral reflectance, according to a fourth embodiment of this application. As shown in FIG. 7, the device 7 for determining spectral reflectance in the embodiment includes a processor 70, a memory 71, and a computer program 72, such as a program for determining spectral reflectance, stored in the memory 71 and executable on the processor 70. When executing the computer program 72, the processor 70 implements the steps in the method for determining spectral reflectance in the foregoing embodiments, for example, steps 201 to 206 shown in FIG. 5. In an embodiment, when executing the computer program 72, the processor 70 implements functions of modules/units in the foregoing apparatus embodiments, for example, functions of modules 610 to 660 shown in FIG. 6.

For example, the computer program 72 may be divided into one or more modules/units, and the one or more modules/units are stored in the memory 71 and executed by the processor 70 to complete this application. The one or more modules/units may be a series of computer program instruction segments capable of performing specific functions, and the instruction segment is configured to describe an execution process of the computer program 72 in the device 7 for determining spectral reflectance. For example, the computer program 72 may be divided into a first obtaining unit, a second obtaining unit, a first calculation unit, a determining unit, a first processing unit, and a second calculation unit. Specific functions of the units are as follows.

The first obtaining unit is configured to obtain a registration depth map and a target spectral image; the second obtaining unit is configured to obtain depth information of a target point from the registration depth map, and obtain a first grayscale value of the target point from the target spectral image; the first calculation unit is configured to calculate three-dimensional coordinate information of the target point in a coordinate system corresponding to an imaging spectrum device according to the depth information of the target point, a first internal parameter of the imaging spectrum device, and first coordinate information of the target point in the target spectral image; the determining unit is configured to determine, according to neighboring points of the target point, normal vector information corresponding to the target point; the first processing unit is configured to input the three-dimensional coordinate information and the normal vector information into a preset full-light model of a diffuse reflecting plate to obtain a second grayscale value; and the second calculation unit is configured to: obtain reflectance of the diffuse reflecting plate, and calculate reflectance of the target point according to the reflectance of the diffuse reflecting plate, the first grayscale value, and the second grayscale value.

The device for determining spectral reflectance may include, but is not limited to, the processor 70 and the memory 71. A person skilled in the art may understand that FIG. 7 is merely an example of the device 7 for determining spectral reflectance, and does not limit the device 7 for determining spectral reflectance. The device 7 for determining spectral reflectance may include more or fewer components than that shown in the figure, or may combine some components, or different components. For example, the device for determining spectral reflectance may further include an input/output device, a network access device, and a bus.

The referred processor 70 may be a central processing unit (Central Processing Unit, CPU), or may be another general purpose processor, a digital signal processor (Digital Signal Processor, DSP), an application specific integrated circuit (Application Specific Integrated Circuit, ASIC), a field-programmable gate array (Field-Programmable Gate Array, FPGA) or another programmable logic device, a discrete gate or transistor logic device, a discrete hardware component, or the like. The general purpose processor may be a microprocessor, or the processor may be any conventional processor or the like.

The memory 71 may be an internal storage unit of the device 7 for determining spectral reflectance, for example, a hard disk or memory of the device 7 for determining spectral reflectance. The memory 71 may be an external storage device of the device 7 for determining spectral reflectance, for example, a removable hard disk, a smart media card (SMC), a secure digital (SD) card, or a flash card equipped on the device 7 for determining spectral reflectance. In an embodiment, the device 7 for determining spectral reflectance may further include an internal storage unit and an external storage device of the device 7 for determining spectral reflectance. The memory 71 is configured to store the computer program and another program and data required by the device for determining spectral reflectance. The memory 71 may be further configured to temporarily store data that has been or is to be output.

It should be noted that content such as information exchange and execution process between the foregoing apparatuses/units is based on the same concept as that in the method embodiments of this application. For specific functions and technical effects brought by the apparatuses/units, refer to the part of the method embodiments. Details are not described herein again.

An embodiment of this application further provides a network device, including a memory, a processor, and a computer program stored in the memory and capable of being run on the processor, and steps of any one of the foregoing method embodiments may be implemented when the processor executes the computer program.

An embodiment of this application further provides a non-transitory computer readable storage medium, where the non-transitory computer readable storage medium stores a computer program, and steps of the foregoing method embodiments may be implemented when the computer program is executed by a processor.

An embodiment of this application provides a computer program product. When the computer program product is executable on a mobile terminal, the steps in the foregoing method embodiments can be implemented when the mobile terminal executes the computer program product.

When the integrated unit is implemented in the form of a software functional unit and sold or used as an independent product, the integrated unit may be stored in a computer-readable storage medium. Based on such understanding, all or some of the processes of the methods in the embodiments may be implemented by a computer program instructing relevant hardware. The computer program may be stored in a computer-readable storage medium. During execution of the computer program by the processor, steps of the foregoing method embodiments may be implemented. The computer program includes computer program code. The computer program code may be in source code form, object code form, executable file or some intermediate forms, or the like. The computer-readable medium, such as a non-transitory computer-readable medium, may at least include: any entity or apparatus that is capable of carrying the computer program code to a camera apparatus/terminal device, a recording medium, a computer memory, a read-only memory (ROM), a random access memory (RAM), an electric carrier signal, a telecommunication signal and a software distribution medium, and the like. For example, a USB flash drive, a removable hard disk, a magnetic disk, an optical disc, or the like. In some jurisdictions, according to legislation and patent practice, the computer-readable medium may not be an electric carrier signal and a telecommunication signal.

In the embodiments, descriptions of the embodiments have different emphases. As for parts that are not described in detail in one embodiment, reference can be made to the relevant descriptions of the other embodiments.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

In the embodiments provided in this application, it is to be understood that the disclosed apparatus/network device and method may be implemented in other manners. For example, the described apparatus/network device embodiment is merely exemplary. For example, the module or unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

The foregoing embodiments are merely for describing the technical solutions of this application, but not for limiting this application. Although this application is described in detail with reference to the foregoing embodiments, it is to be understood by a person of ordinary skill in the art that they may still make modifications to the technical solutions described in the foregoing embodiments or make equivalent replacements to some technical features thereof, without departing from the spirit and scope of the technical solutions of the embodiments of this application, which being included in the protection scope of this application.

What is claimed is:

1. A method for determining spectral reflectance, comprising:
obtaining a registration depth map and a target spectral image;
obtaining depth information of a target point from the registration depth map, and obtaining a first grayscale value of the target point from the target spectral image;
calculating three-dimensional coordinate information of the target point in a coordinate system corresponding to an imaging spectrum device according to the depth information of the target point, a first internal parameter of the imaging spectrum device, and first coordinate information of the target point in the target spectral image;
determining, according to neighboring points of the target point, normal vector information corresponding to the target point;
inputting the three-dimensional coordinate information and the normal vector information into a full-light model of a diffuse reflecting plate to obtain a second grayscale value; and
obtaining reflectance of the diffuse reflecting plate, and calculating reflectance of the target point according to the reflectance of the diffuse reflecting plate, the first grayscale value, and the second grayscale value.

2. The method according to claim 1, wherein the obtaining a registration depth map comprises:
obtaining an initial depth map output by a three-dimensional (3D) measurement device; and
converting the initial depth map into the registration depth map according to a target external parameter, the first internal parameter of the imaging spectrum device, and a second internal parameter of the 3D measurement device.

3. The method according to claim 1, wherein before the obtaining a registration depth map and a target spectral image, the method further comprises:
obtaining an initial spectral image and a dark field image; and
obtaining the target spectral image according to the initial spectral image and the dark field image.

4. The method according to claim 1, wherein before the inputting the three-dimensional coordinate information and the normal vector information into a full-light model of a diffuse reflecting plate to obtain a second grayscale value, the method further comprises:
obtaining sample data of each pose at a target wavelength, wherein the sample data includes a sample grayscale value of a sample point, sample normal vector information, and sample three-dimensional coordinate information; and
obtaining the full-light model of the diffuse reflecting plate by performing fitting processing on the sample data.

5. The method according to claim 1, further comprising:
determining a spectral reflectance curve of an object according to reflectance of target points in the registration depth map.

6. The method according to claim 1, wherein the determining, according to neighboring points of the target point, normal vector information corresponding to the target point comprises:
determining, according to the neighboring points of the target point, a spatial curved surface formed by the neighboring points, and obtaining, according to the spatial curved surface, the normal vector information corresponding to the target point.

7. A device for determining spectral reflectance, including a memory, a processor, and a computer program stored in the memory and executable on the processor, wherein the processor executes the computer program to perform operations comprising:

obtaining a registration depth map and a target spectral image;

obtaining depth information of a target point from the registration depth map, and obtaining a first grayscale value of the target point from the target spectral image;

calculating three-dimensional coordinate information of the target point in a coordinate system corresponding to an imaging spectrum device according to the depth information of the target point, a first internal parameter of the imaging spectrum device, and first coordinate information of the target point in the target spectral image;

determining, according to neighboring points of the target point, normal vector information corresponding to the target point;

inputting the three-dimensional coordinate information and the normal vector information into a full-light model of a diffuse reflecting plate to obtain a second grayscale value; and obtaining reflectance of the diffuse reflecting plate, and calculating reflectance of the target point according to the reflectance of the diffuse reflecting plate, the first grayscale value, and the second grayscale value.

8. The device according to claim 7, wherein the obtaining a registration depth map comprises:

obtaining an initial depth map output by a three-dimensional (3D) measurement device; and converting the initial depth map into the registration depth map according to a target external parameter, the first internal parameter of the imaging spectrum device, and a second internal parameter of the 3D measurement device.

9. The device according to claim 7, wherein before the obtaining a registration depth map and a target spectral image, the operations further comprise:

obtaining an initial spectral image and a dark field image; and obtaining the target spectral image according to the initial spectral image and the dark field image.

10. The device according to claim 7, wherein before the inputting the three-dimensional coordinate information and the normal vector information into a full-light model of a diffuse reflecting plate to obtain a second grayscale value, the operations further comprise:

obtaining sample data of each pose at a target wavelength, wherein the sample data includes a sample grayscale value of a sample point, sample normal vector information, and sample three-dimensional coordinate information; and obtaining the full-light model of the diffuse reflecting plate by performing fitting processing on the sample data.

11. The device according to claim 7, wherein the operations further comprise:

determining a spectral reflectance curve of an object according to reflectance of target points in the registration depth map.

12. The device according to claim 7, wherein the determining, according to neighboring points of the target point, normal vector information corresponding to the target point comprises:

determining, according to the neighboring points of the target point, a spatial curved surface formed by the neighboring points, and obtaining, according to the spatial curved surface, the normal vector information corresponding to the target point.

13. A non-transitory computer readable storage medium, wherein the non-transitory computer readable storage medium stores a computer program, and when the computer program is executed by a processor, the computer program causes the processor to perform operations comprising:

obtaining a registration depth map and a target spectral image;

obtaining depth information of a target point from the registration depth map, and obtaining a first grayscale value of the target point from the target spectral image;

calculating three-dimensional coordinate information of the target point in a coordinate system corresponding to an imaging spectrum device according to the depth information of the target point, a first internal parameter of the imaging spectrum device, and first coordinate information of the target point in the target spectral image;

determining, according to neighboring points of the target point, normal vector information corresponding to the target point;

inputting the three-dimensional coordinate information and the normal vector information into a full-light model of a diffuse reflecting plate to obtain a second grayscale value; and obtaining reflectance of the diffuse reflecting plate, and calculating reflectance of the target point according to the reflectance of the diffuse reflecting plate, the first grayscale value, and the second grayscale value.

14. The medium according to claim 13, wherein the obtaining a registration depth map comprises:

obtaining an initial depth map output by a three-dimensional (3D) measurement device; and converting the initial depth map into the registration depth map according to a target external parameter, the first internal parameter of the imaging spectrum device, and a second internal parameter of the 3D measurement device.

15. The medium according to claim 13, wherein before the obtaining a registration depth map and a target spectral image, the operations further comprise:

obtaining an initial spectral image and a dark field image; and obtaining the target spectral image according to the initial spectral image and the dark field image.

16. The medium according to claim 13, wherein before the inputting the three-dimensional coordinate information and the normal vector information into a full-light model of a diffuse reflecting plate to obtain a second grayscale value, the operations further comprise:

obtaining sample data of each pose at a target wavelength, wherein the sample data includes a sample grayscale value of a sample point, sample normal vector information, and sample three-dimensional coordinate information; and obtaining the full-light model of the diffuse reflecting plate by performing fitting processing on the sample data.

17. The medium according to claim 13, wherein the operations further comprise:

determining a spectral reflectance curve of an object according to reflectance of target points in the registration depth map.

18. The medium according to claim 13, wherein the determining, according to neighboring points of the target point, normal vector information corresponding to the target point comprises:

determining, according to the neighboring points of the target point, a spatial curved surface formed by the neighboring points, and obtaining, according to the spatial curved surface, the normal vector information corresponding to the target point.

* * * * *